United States Patent
Wang et al.

(10) Patent No.: US 11,032,719 B2
(45) Date of Patent: Jun. 8, 2021

(54) BEAM CONFIGURATION MANAGEMENT SERVICE

(71) Applicant: Verizon Patent and Licensing Inc., Arlington, VA (US)

(72) Inventors: Xin Wang, Morris Plains, NJ (US); Lily Zhu, Parsippany, NJ (US); Hui Zhao, Marlboro, NJ (US); Andrew E. Youtz, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/371,731

(22) Filed: Apr. 1, 2019

(65) Prior Publication Data
US 2020/0314663 A1    Oct. 1, 2020

(51) Int. Cl.
| | |
|---|---|
| *H04W 16/28* | (2009.01) |
| *H04B 7/06* | (2006.01) |
| *H04W 72/04* | (2009.01) |
| *H04W 76/10* | (2018.01) |
| *H04W 84/04* | (2009.01) |

(52) U.S. Cl.
CPC .......... *H04W 16/28* (2013.01); *H04B 7/0617* (2013.01); *H04B 7/0628* (2013.01); *H04W 72/042* (2013.01); *H04W 72/046* (2013.01); *H04W 76/10* (2018.02); *H04W 84/042* (2013.01)

(58) Field of Classification Search
CPC ... H04W 16/28; H04W 72/042; H04W 76/10; H04W 72/046; H04W 84/042; H04B 7/0617; H04B 7/0628
See application file for complete search history.

(56) References Cited

U.S. PATENT DOCUMENTS

2018/0359790 A1* 12/2018 Ingale .................. H04W 28/16
* cited by examiner

*Primary Examiner* — Brenda H Pham

(57) ABSTRACT

A method, a device, and a non-transitory storage medium are described in which beam configuration management service is provided. A network device of a wireless access network provides the service that includes identifying redundant configurations across carriers associated with a cell group, and links the common beam configurations to these carriers. The service also includes identifying any difference beam configurations relative to the common beam configurations for a carrier. The service may transmit this beam configuration information in a control plane message to an end device. The end device may use the beam configuration information.

20 Claims, 13 Drawing Sheets

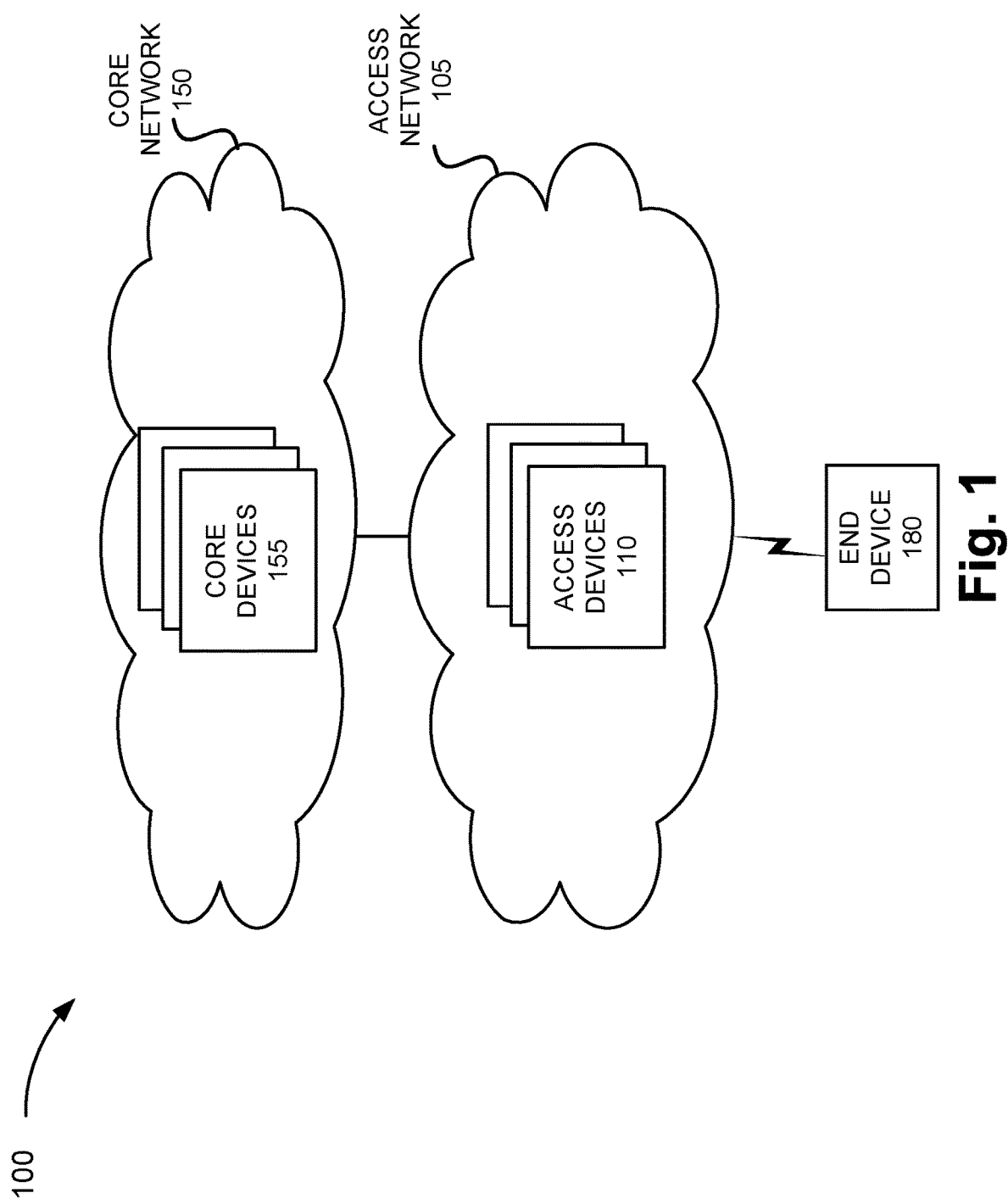

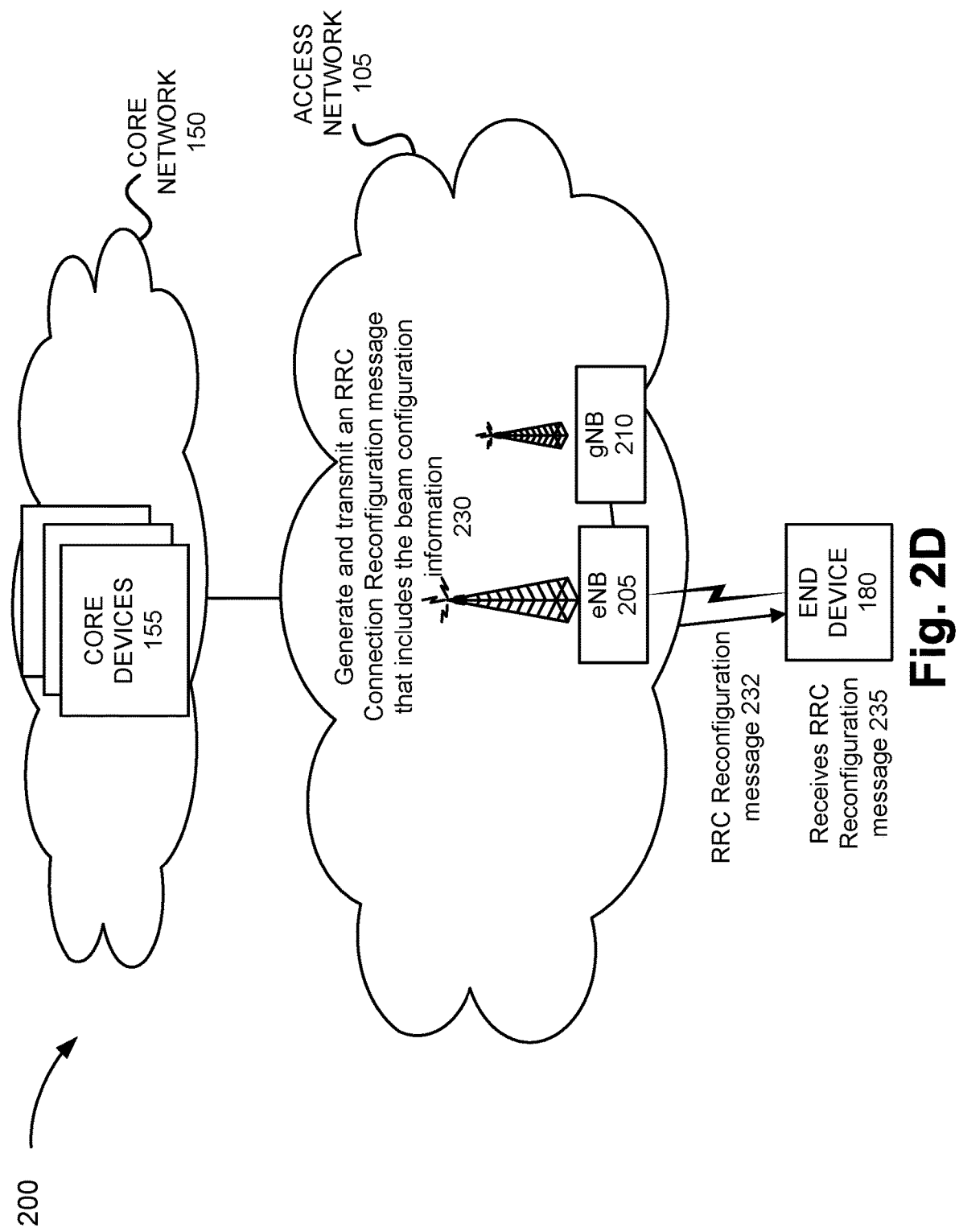

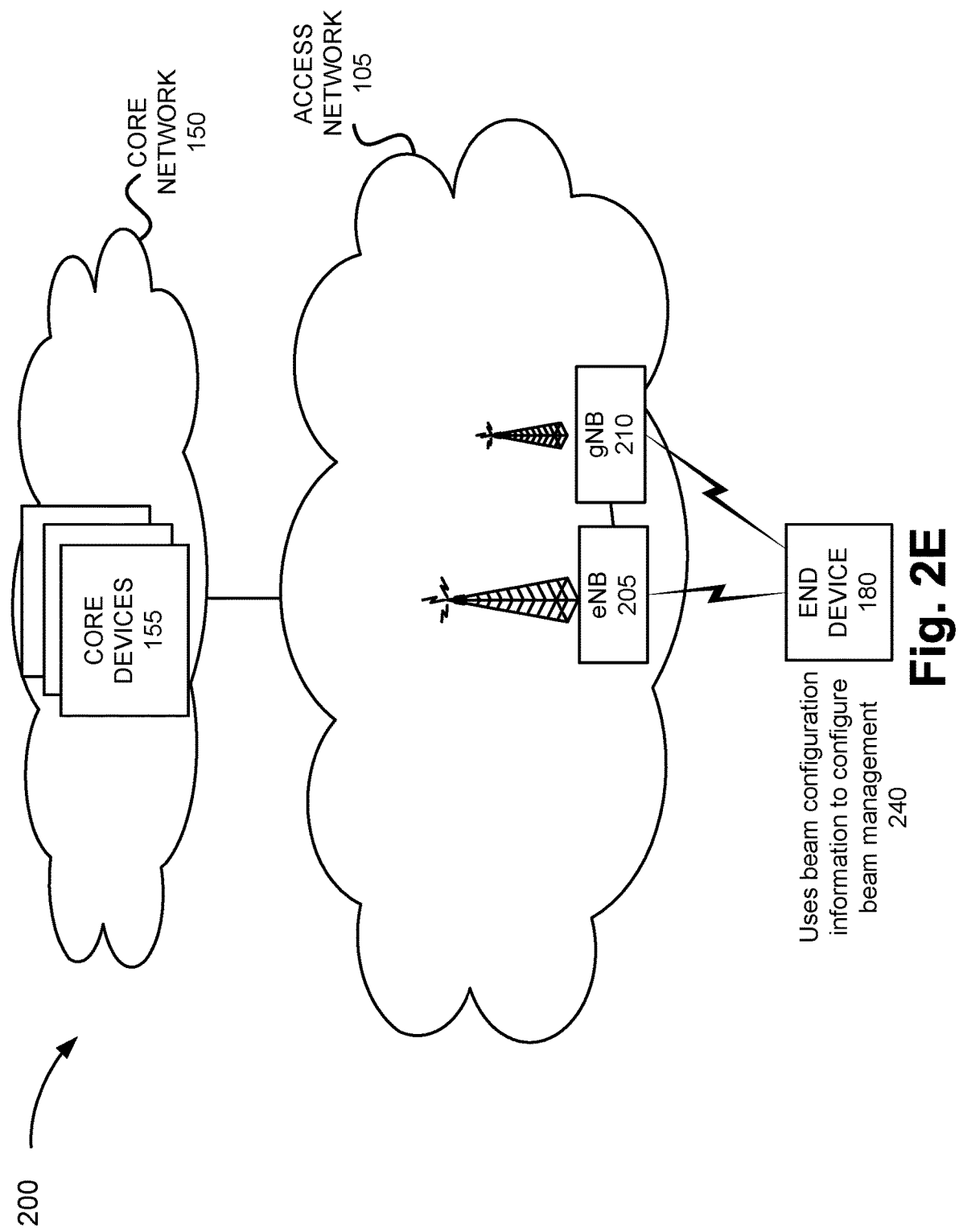

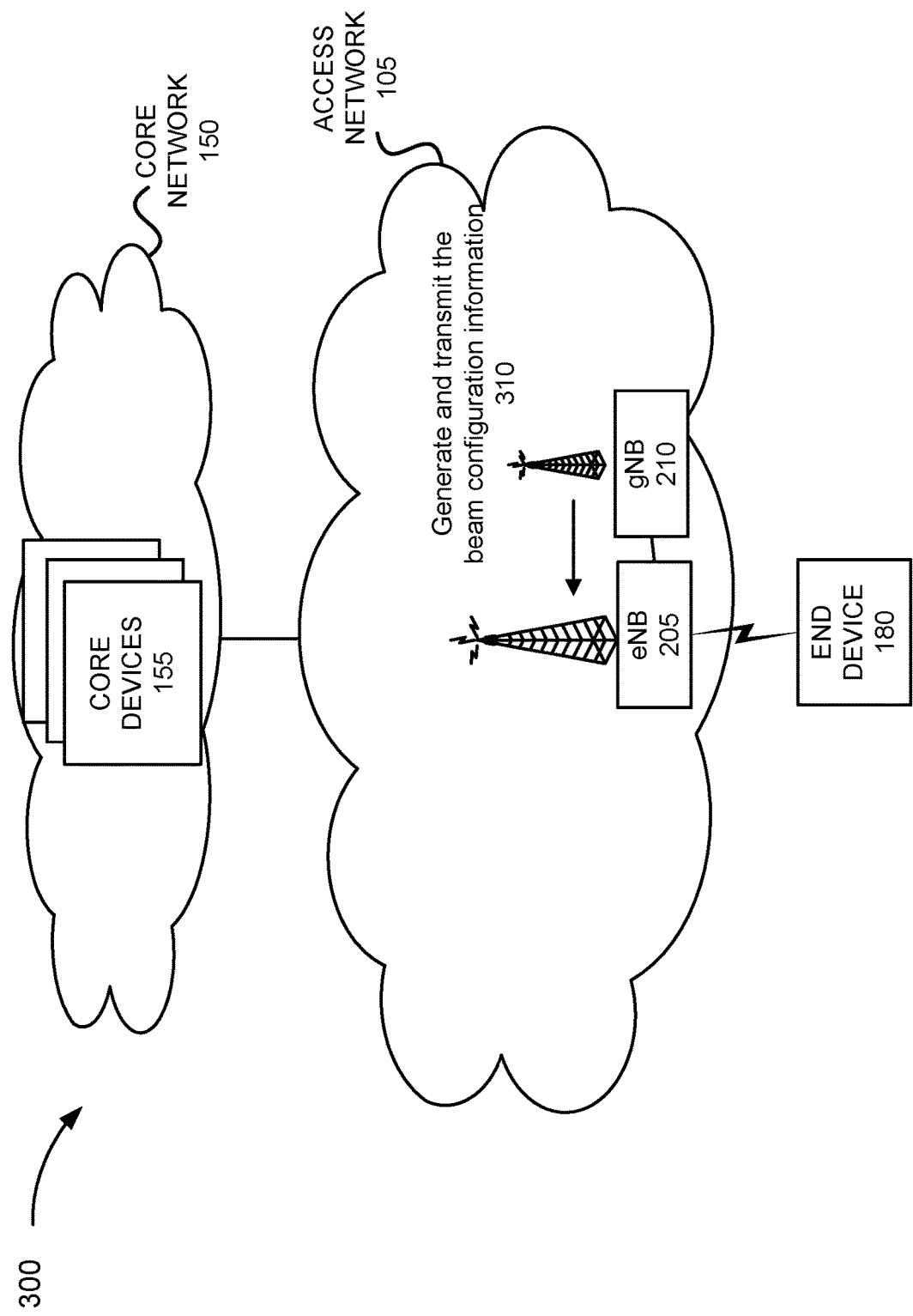

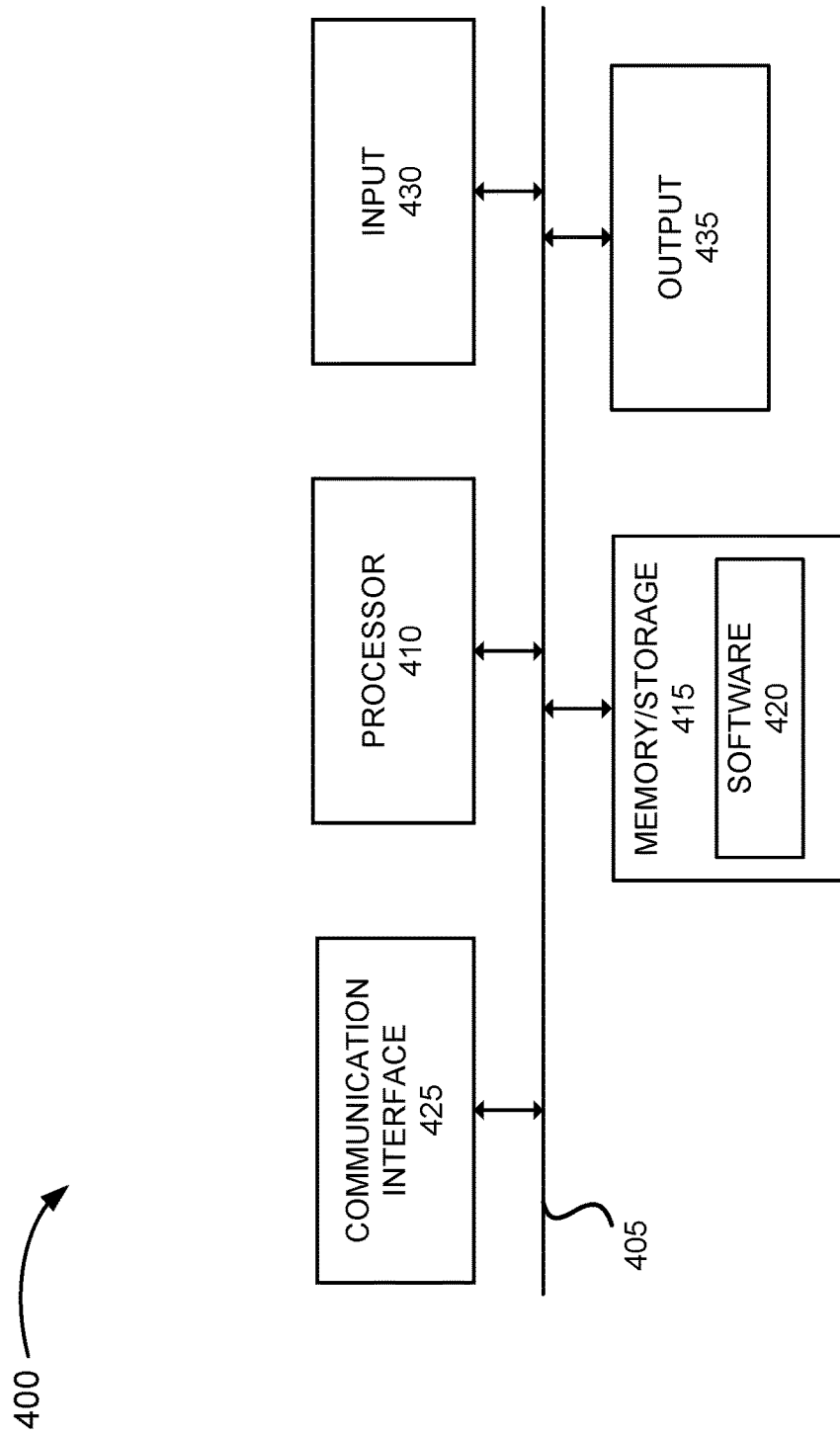

BEAM CONFIGURATION MANAGEMENT SERVICE

BACKGROUND

Development and design of radio access networks (RAN) and core networks present certain challenges from a network-side perspective and an end device perspective. For example, depending on the configurations from both network-side and end device-side perspectives, such configurations may reduce the effective use of resources. Accordingly, a need exists to overcome these challenges.

BRIEF DESCRIPTION OF THE DRAWINGS

FIG. 1 is a diagram illustrating an exemplary environment in which an exemplary embodiment of a beam configuration management service may be implemented;

FIGS. 2A-2E are diagrams illustrating an exemplary process of an exemplary embodiment of the beam configuration management service;

FIGS. 3A-3D are diagrams illustrating another exemplary process of an exemplary embodiment of the beam configuration management service;

FIG. 4 is a diagram illustrating exemplary components of a device that may correspond to one or more of the devices illustrated and described herein;

DETAILED DESCRIPTION OF PREFERRED EMBODIMENTS

Figure 2A:
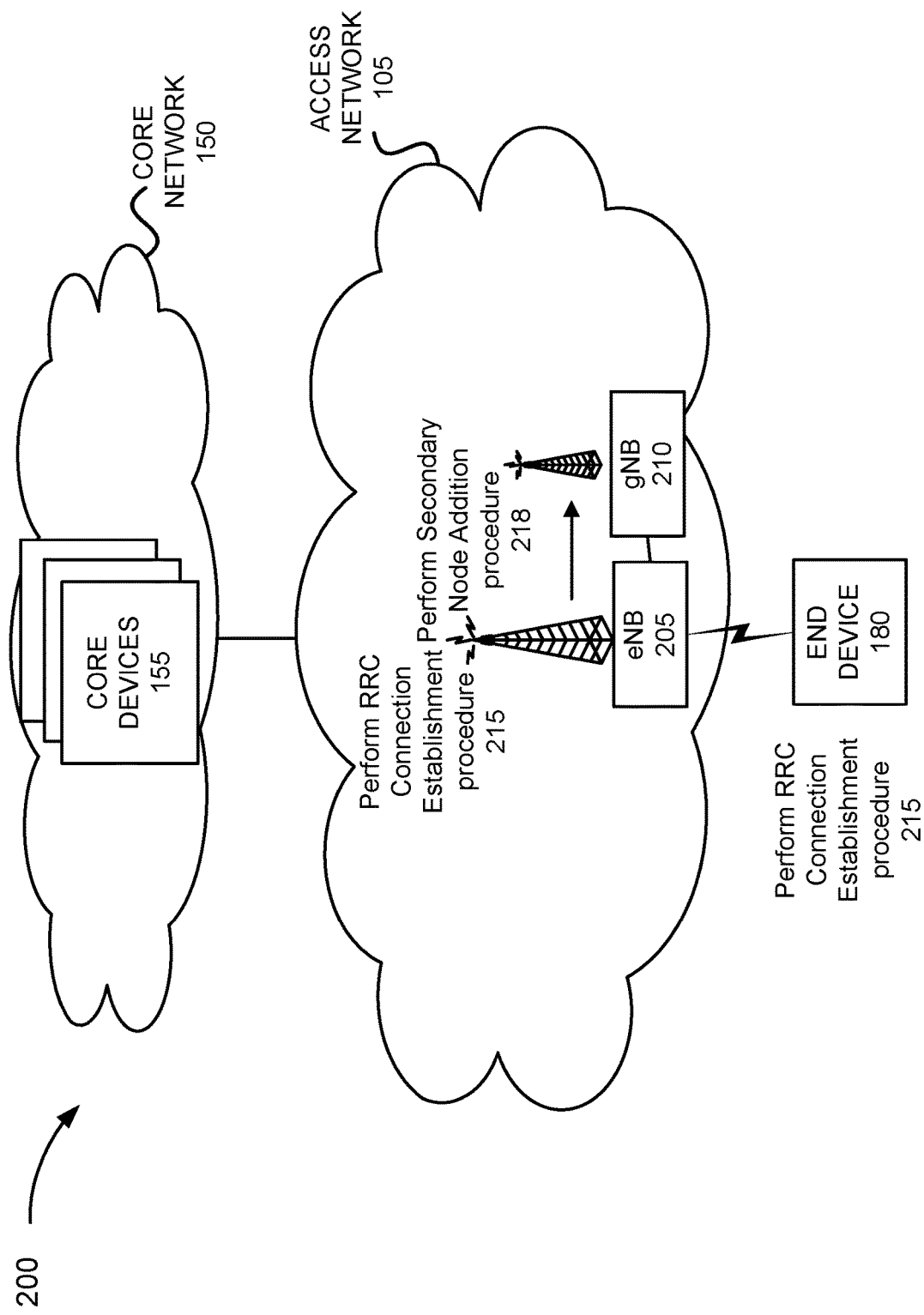

The following detailed description refers to the accompanying drawings. The same reference numbers in different drawings may identify the same or similar elements. Also, the following detailed description does not limit the invention.

A wireless network should support various use cases, meet various performance metrics, allow for scalability and flexibility, and provide optimal use of network resources (e.g., over-the-air, physical, logical, virtual). Additionally, an end device may support various use cases (e.g., enhanced mobile broadband (eMBB), ultra-reliable low-latency communication (URLLC), massive machine-type communications (mMTC), etc.) and provide optimal use of end device-side resources.

For an end device to acquire wireless service of a network, the end device has to establish a wireless connection (e.g., a Radio Resource Control (RRC) connection) with a RAN, and may authenticate, register, and establish a bearer with a core network. With future wireless access technologies under development, such as Fifth Generation (5G), narrow beams may be formed with millimeter wave (mmWave) radio frequency (RF) carriers that may provide a link budget gain required to sustain service performance (e.g., coverage, capacity, user throughput, etc.) and to ensure the number of new radio (NR) cell sites is feasible for deployment.

However, narrower beam widths relative to legacy radio technologies (e.g., Fourth Generation (4G), 4.5G, etc.) can result in a larger number of beams (e.g., synchronization signal block (SSB) beams, refinement beams, etc.) for each mmWave carrier. As a result, beam management information communicated to an end device, via a message (e.g., an RRC message), may be increased due to the large number of beams. Further, for example, in view of the large bandwidth using mmWave bands, there may be a number of component carriers (e.g., 8, 10, 12, etc.) in NR carrier aggregation (CA), which can further contribute to an increase in the size of the message that includes beam configuration information.

Given the large number and size of RRC signaling messages, such messaging can negatively impact the network. For example, such messaging increases the control signaling overhead on the network, which in turn reduces the number of bits available for end device traffic. Also, such messaging can significantly reduce the control signaling capacity of the network. Since control signaling capacity is finite, such large signaling (e.g., in terms of size and number) will reduce the number of end devices that can be served by the network and/or cause signaling delays. In the case of Evolved Universal Terrestrial Radio Access-New Radio (E-UTRA-NR) Dual Connectivity (EN-DC) deployment, these signaling messages may be transmitted via a Long Term Evolution (LTE) carrier, and will further congest the LTE carrier.

According to exemplary embodiments, a beam configuration management service is described. According to an exemplary embodiment, a wireless station of a wireless access network includes logic that provides the beam configuration management service. According to an exemplary embodiment, the wireless station selects beam configuration information for wireless resources based on network configuration and end device capability information. According to an exemplary embodiment, the beam configuration management service uses a control plane message to transmit bean configuration information to end devices. For example, the control plane message may include one or multiple information elements (IEs) that include beam configuration information, as described herein.

According to an exemplary implementation, the control plane message is an RRC message. According to another exemplary implementation, the control plane message is a system information block (SIB) message. According to yet exemplary implementation, the control plane message is another type of message that may be transmitted to an end device as a part of procedure (e.g., a handover procedure, etc.) subsequent to an attachment procedure. According to various exemplary embodiments, beam configuration information may be transmitted to the end device using one or multiple messages. Additionally, according to various exemplary embodiments, beam configuration information may be linked between multiple messages transmitted to the end device, as described herein.

According to an exemplary embodiment, the beam configuration management service includes a control plane message that indicates a beam configuration for a carrier of a wireless station is the same as the beam configuration of another carrier. For example, the control plane message may indicate a beam configuration of a secondary serving cell is the same as a beam configuration of a primary cell. For purposes of description, a cell may be considered a carrier or a combination of a carrier and wireless service area (e.g., cell sector).

According to an exemplary embodiment, the beam configuration management service includes a control plane message that indicates a difference between a beam configuration of a primary cell relative to a secondary cell. For example, the control plane message may include one or multiple parameters and corresponding values pertaining to the secondary cell that are different from the primary cell.

According to an exemplary embodiment, the beam configuration management service includes a control plane message that indicates a beam configuration of a secondary cell is the same or similar to a beam configuration of another secondary cell. The beam configuration of the secondary cell may be different from the primary cell.

According to an exemplary embodiment, the beam configuration management service includes a control plane message that indicates a default beam configuration for multiple cells. For example, the control plane message may include beam management information that is the same or similar relative to multiple carriers. According to an exemplary embodiment, the beam configuration management service includes a control plane message that indicates a difference in beam configuration relative to the default beam configuration.

According to an exemplary embodiment, the beam configuration management service selects a beam management configuration based on network configuration and end device capability information, as described herein. For example, the network configuration may include transmission configuration indicator (TCI) data, quasi-colocation (QCL) data, channel state information-reference signal (CSI-RS) resource data, and/or other types of data pertaining to beam management. End device capability information may include data pertaining to the radio capabilities of the end device (e.g., carriers supported, CA capabilities, TCI states supported, etc.).

According to an exemplary embodiment, the beam configuration management service includes the end device receiving the control plane message, and using the beam configuration information to obtain wireless service via the RAN, as described herein.

As a result, the beam configuration management service may improve network resource utilization in a network. For example, the beam configuration management service may improve the use of various network resources (e.g., physical, logical, virtual) in relation to network devices of a RAN or network devices of the RAN and a core network based on the reduction of messages being transmitted and received regarding beam configuration information to the end device. Additionally, the beam configuration management service may improve resource utilization at the end device for similar reasons.

FIG. 1 is a diagram illustrating an exemplary environment 100 in which an exemplary embodiment of the beam configuration management service may be implemented. As illustrated, environment 100 includes an access network 105 and a core network 150. Access network 105 includes access devices 110, and core network 150 includes core devices 155. Environment 100 further includes an end device 180.

The number, the type, and the arrangement of network devices in access network 105 and core network 150, as illustrated and described, are exemplary. The number of end devices 180 is exemplary. A network device, a network element, or a network function (referred to herein simply as a network device) may be implemented according to one or multiple network architectures (e.g., a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links between the network devices, and between end device 180 and network devices. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

Access network 105 may include one or multiple networks of one or multiple types and technologies. For example, access network 105 may include a 4G RAN, a 4.5G RAN, a 5G RAN, and/or another type of future generation RAN. By way of further example, access network 105 may be implemented to include an Evolved UMTS Terrestrial Radio Access Network (E-UTRAN) of a Long Term Evolution (LTE) network, an LTE-Advanced (LTE-A) network, and/or an LTE-A Pro network, a next generation (NG) RAN, and/or another type of RAN (e.g., a legacy RAN). Access network 105 may further include other types of wireless networks, such as a WiFi network, a Worldwide Interoperability for Microwave Access (WiMAX) network, a local area network (LAN), or another type of network that may provide an on-ramp to access devices 110 and/or core network 150.

According to various exemplary embodiments, access network 105 may be implemented to include various architectures of wireless service, such as, for example, macrocell, microcell, femtocell, picocell, metrocell, NR cell, LTE cell, non-cell, or another type of cell architecture. Additionally, according to various exemplary embodiments, access network 105 may be implemented according to various wireless technologies (e.g., radio access technology (RAT), etc.), wireless standards, wireless frequencies/bands, and so forth.

Access network 105 may include different and multiple functional splitting, such as options 1, 2, 3, 4, 5, 6, 7, or 8 that relate to combinations of access network 105 and core network 150 including an Evolved Packet Core (EPC) network and/or a NG core (NGC) network, or the splitting of the various layers (e.g., physical layer, Media Access Control (MAC) layer, Radio Link Control (RLC) layer, and Packet Data Convergence Control (PDCP) layer), plane splitting (e.g., user plane, control plane, etc.), centralized unit (CU) and distributed unit (DU), interface splitting (e.g., F1-U, F1-C, E1, Xn-C, Xn-U, X2-C, Common Public Radio Interface (CPRI), etc.) as well as other types of network services, such as dual connectivity (DC) or higher (e.g., a secondary cell group (SCG) split bearer service, a master cell group (MCG) split bearer, an SCG bearer service, non-standalone (NSA), standalone (SA), etc.), CA (e.g., intra-band, inter-band, contiguous, non-contiguous, etc.), network slicing, coordinated multipoint (CoMP), various duplex schemes (e.g., frequency division duplex (FDD), time division duplex (TDD), half-duplex FDD (H-FDD), etc.), and/or another type of connectivity service.

Depending on the implementation, access network 105 may include one or multiple types of network devices, such as access devices 110. For example, access devices 110 may include an evolved Node B (eNB), a next generation Node B (gNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.)), or another type of wireless node. According to an exemplary embodiment, access device 110 includes logic that provides the beam configuration management service, as described herein.

Core network 150 may include one or multiple networks of one or multiple types and technologies. According to an exemplary embodiment, core network 150 includes a complementary network of access network 105. For example, core network 150 may be implemented to include an EPC of an LTE, a core network of an LTE-Advanced (LTE-A) network, a core network of an LTE-A Pro network, and/or a next generation core (NGC) network. Core network 150 may include a legacy core network.

Depending on the implementation, core network 150 may include various types of network devices, such as core devices 155. According to an exemplary embodiment, one or multiple core devices 155 include logic that provides the policy delivery service, as described herein. For example, core devices 155 may include a mobility management entity (MME), a packet gateway (PGW), a serving gateway (SGW), a home subscriber server (HSS), an authentication, authorization, and accounting (AAA) server, a policy charging and rules function (PCRF), a charging system (CS), a user plane function (UPF), an access and mobility management function (AMF), a session management function (SMF), a unified data management (UDM) device, an authentication server function (AUSF), a network slice selection function (NSSF), a network repository function (NRF), a policy control function (PCF), and so forth. According to other exemplary implementations, core devices 155 may include additional, different, and/or fewer network devices than those described.

End device 180 includes a device that has computational and wireless communication capabilities. Depending on the implementation, end device 180 may be a mobile device, a portable device, a stationary device, a device operated by a user, or a device not operated by a user. For example, end device 180 may be implemented as a Mobile Broadband device, a Machine Type Communication (MTC) device, an Internet of Things (IoT) device, an enhanced MTC device (eMTC) (also known as Cat-M1), a NarrowBand IoT (NB-IoT) device, a machine-to-machine (M2M) device, a user device, or other types of wireless end nodes. By way of further example, end device 180 may be implemented as a smartphone, a personal digital assistant, a tablet, a netbook, a phablet, a wearable device (e.g., a watch, glasses, etc.), a set top box, an infotainment system in a vehicle, a vehicle support system, a smart television, a game system, a music playing system, or other types of wireless end devices. End device 180 may be configured to execute various types of software (e.g., applications, programs, etc.). The number and the types of software may vary among end devices 180.

End device 180 may support one or multiple RATs (e.g., 4G, 5G, etc.) and various portions of the radio spectrum (e.g., multiple frequency bands, multiple carrier frequencies, licensed, unlicensed, etc.). Additionally, end device 180 may include one or multiple communication interfaces that provide one or multiple (e.g., simultaneous) connections via the same or different RATs, frequency bands, and so forth. The multimode capabilities of end device 180 may vary among end devices 180. According to an exemplary embodiment, end device 180 includes logic that provides the beam configuration management service, as described herein.

FIGS. 2A-2E are diagrams illustrating an exemplary process of an exemplary embodiment of the beam configuration management service. As illustrated, an environment 200, which is consistent with environment 100, access network 105 includes an eNB 205 and gNB 210. For purposes of description in relation to the beam management service and DC, such as NSA EN-DC, NE-DC, and SA NR-NR DC, a special cell (e.g., SpCell) may refer to the primary cell (PCell) of an MCG, or a primary secondary cell (PSCell) of an SCG. Alternatively, in a non-DC context, SpCell may refer to the PCell. FIGS. 2A-2E relate to an exemplary NSA scenario. However, as described herein, the beam configuration management service may be used in a SA context.

Figure 2B:
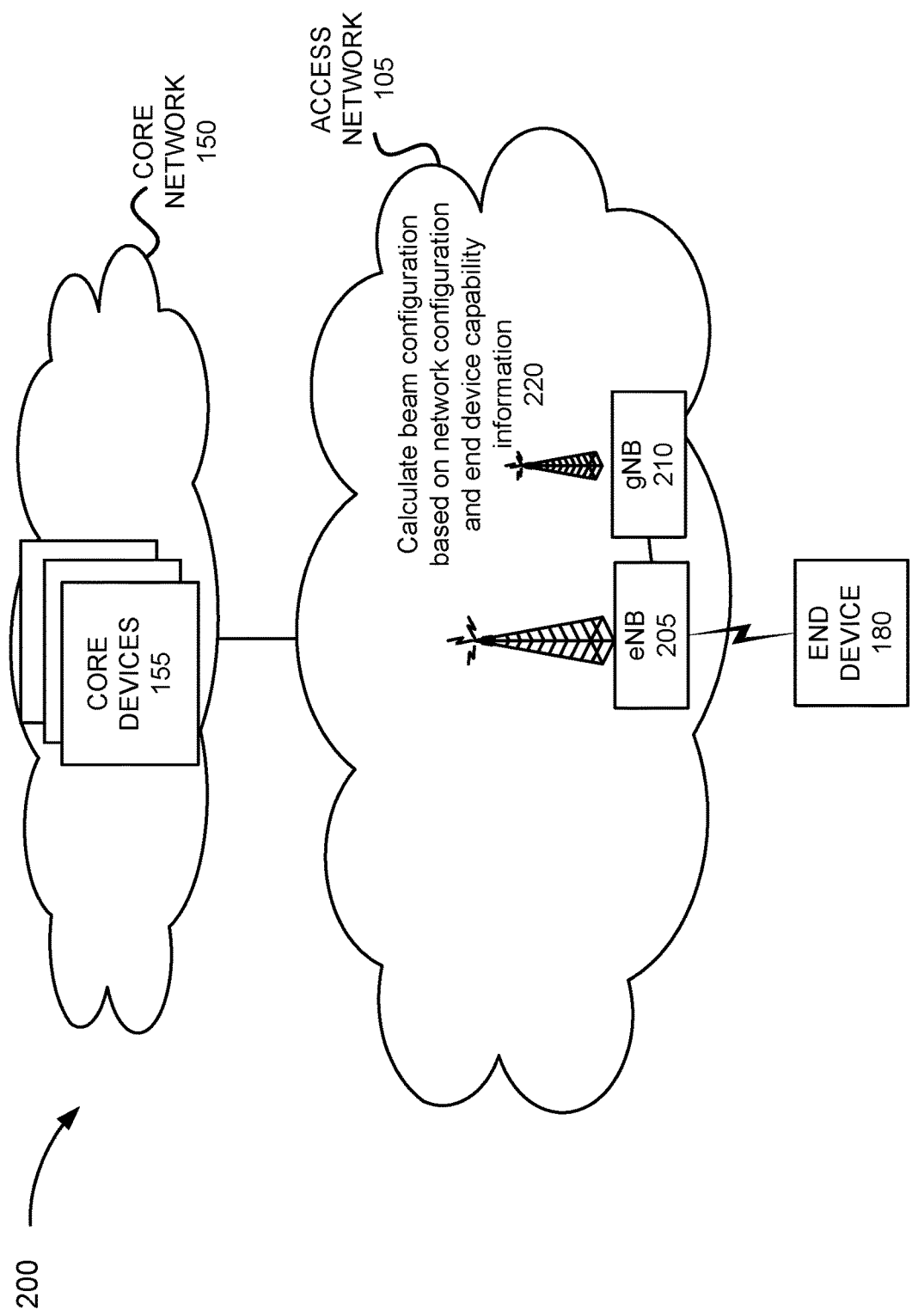

Referring to FIG. 2A, eNB 205 may be a master node, and gNB 210 may be a secondary node. According to an exemplary scenario, assume that end device 180 establishes an RRC connection with eNB 205 based on an RRC Connection Establishment procedure 215. Thereafter, eNB 205 may perform a secondary node addition procedure with gNB 210 to add a NR cell to the LTE cell. For example, eNB 205 may generate and transmit an addition request to gNB 210. Referring to FIG. 2B, in response to receiving the addition request, gNB 210 may calculate beam configuration for end device 180 based on network configuration and end device capability information 220. gNB 210 may obtain end device capability information pertaining to end device 180 from eNB 205 or from core device 155. gNB 210 may calculate network configuration information based on end device measurement reports, pre-configured network parameters, channel state information, and other relevant information used by RRC logic at access device 110.

As previously described, according to various exemplary embodiments, the beam configuration management service includes various control plane messages that provide beam configuration. In this regard, gNB 210 may select beam configurations for all carriers based on the network configuration and end device capability information.

According to an exemplary embodiment, if the configurations are the same within a cell group, gNB 210 may configure a SpCell with a full beam configuration, and link secondary cell configuration(s) to the SpCell configuration. For example, beam management IEs for a secondary serving cell may not need to be sent, but simply linked to a primary cell configuration. By way of further example, the linking between the primary cell and one or multiple secondary serving cells may be expressed by a single bit or another data instance (e.g., multiple bits). Below is an exemplary representation of data that may be included in a control plane message that links primary and secondary cell configurations that are the same (also referred to as message 1).

---

Beam-Management IE A/B/C/...
{
    linkToSpCell    Type: Boolean
    List of Beam Management Configurations:
    (present when linkToSpCell is false)
}

---

According to another exemplary embodiment, if some configurations are the same for multiple cells, gNB 210 may configure a SpCell and secondary cell(s) based on message 1 described above, as well as include a delta configuration for a remaining portion of the configuration this is different between the SpCell and the secondary cell. That is, the control plane message may modify or add a beam configuration pertaining to a secondary cell included message 1. Below is an exemplary representation of data that may be included in a control plane message that modifies or adds a configuration of a secondary cell (also referred to as message 2).

```
Beam-Management IE A/B/C ...
{
linkToSpCell:      True
    Remove
    {
        List of SpCell Beam management configurations
        that SCell has different
        configuration than SpCell;
    }
    Add or Modify
    {
        List of SCell Beam management configurations
        that SCell has different
        configuration than SpCell;
    }
}
```

According to yet another exemplary embodiment, if the configurations are the same or similar among the secondary cells, but are different from the SpCell configuration, gNB 210 may configure secondary cells that have the same or similar configurations. For example, gNB 210 may link a secondary cell configuration to another secondary cell (e.g., of a particular serving cell identifier) (also referred to as message 3).

```
Beam-Management IE A/B/C ...
{
    linkToSpCell      Type: Boolean
    linkToAnyCell:    Type: Integer for Serving Cell ID
                      (not present when linkToSpCell
                      is True)
    List of Beam Management configurations (present when
    linkToSpCell is False and linkToAnyCell is not present)
    //Below are optionally present when either linkToSpCell is True or
linkToAnyCell is present
        Remove
        {
            List of Beam management configurations on the linked
SpCell/SCell that a SCell has a different configuration with;
        }
        Add or Modify
        {
            List of Beam management configurations on a SCell
that the SCell has a different configuration than the linked
SpCell/SCell;
        }
}
```

According to an exemplary embodiment of the beam configuration management service, gNB 210 may select the configuration of message 2 or message 3 depending on whether the secondary cell is linked to SpCell. According to various exemplary embodiments, gNB 210 may select multiple messages and various combinations of these messages to configure carriers/cells, as described herein.

Figure 2C:
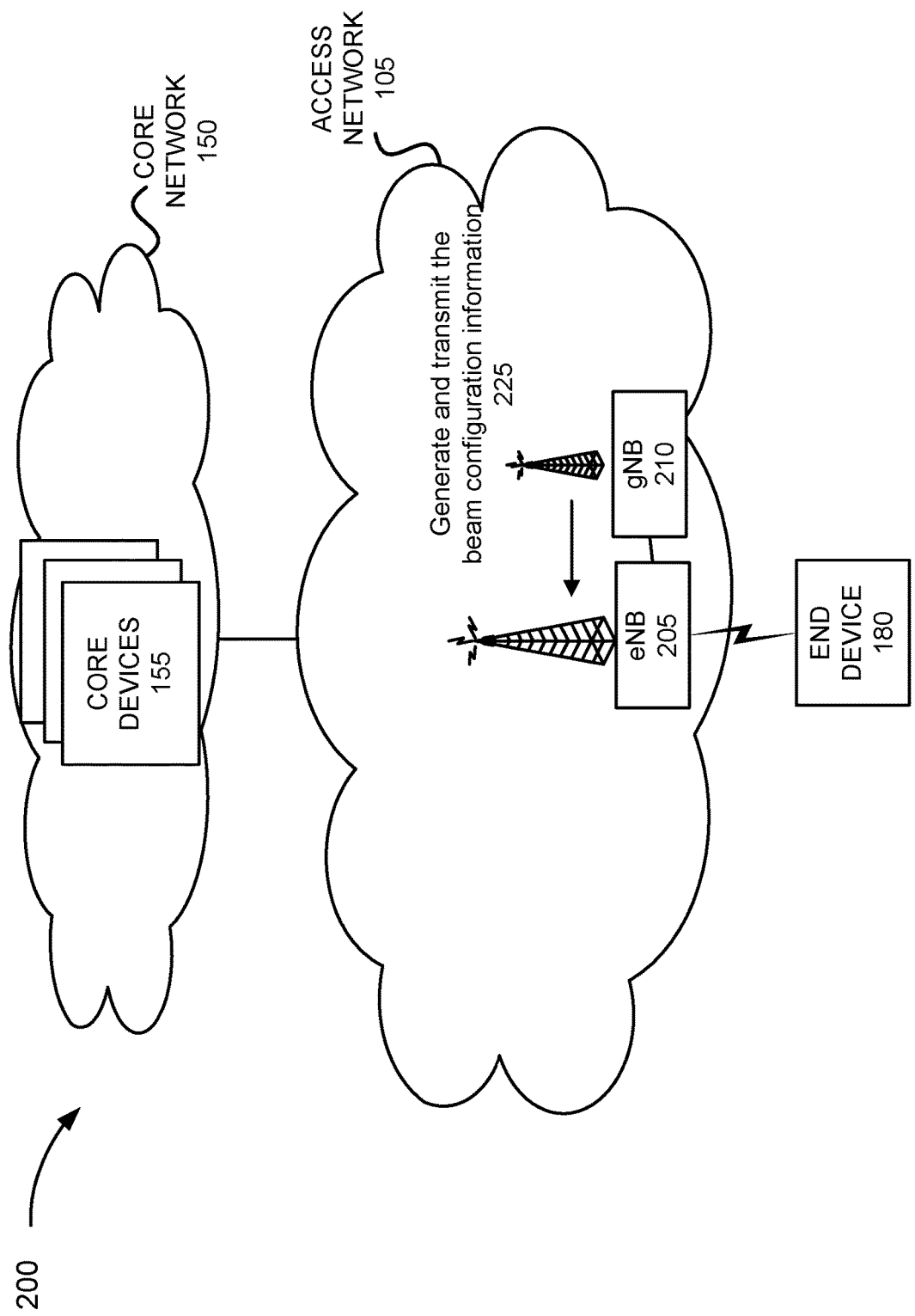

Referring to FIG. 2C, gNB 210 may generate and transmit a message, which includes the beam configuration information 225, to eNB 205. According to an exemplary implementation, the message may be included in an addition request acknowledgment message associated with the secondary node addition procedure. According to other exemplary implementations, the message may be that is not part of the secondary node addition procedure.

Referring to FIG. 2D, in response to receiving the message, eNB 205 may invoke an RRC Connection Reconfiguration procedure. For example, eNB 205 may generate and transmit an RRC Connection Reconfiguration message, which includes the beam configuration information 230, to end device 180. The RRC Reconfiguration message 232 may include one or multiple IEs that provide beam configuration for carriers, as described herein. End device 180 may receive the RRC Reconfiguration message 235.

Referring to FIG. 2E, in response to receiving the RRC Reconfiguration message, end device 180 includes logic of the beam configuration management service to extract and use the beam configuration information to configure beam management functions 240. For example, end device 180 may analyze and use the beam management configuration for all carriers based on the linked beam configuration information and the other beam configuration information (e.g., delta beam configuration information, etc.). Although not illustrated, end device 180 may generate and transmit a message pertaining to the RRC Connection Reconfiguration procedure, may perform a random access procedure relative to gNB 210, and may establish a radio connection with gNB 210.

Although FIGS. 2A-2E illustrate an exemplary process of the beam configuration management service, according to other exemplary embodiments, the process may include additional, different, and/or fewer steps, and/or include additional, different, and/or fewer messages. For example, according to an exemplary SA scenario, gNB 210 may generate and transmit an RRC Reconfiguration message, which includes beam configuration information, to end device 180 as a part of an attachment procedure with end device 180. For example, gNB 210 may transmit the RRC Reconfiguration message subsequent to end device 180 successfully completing authentication and security with core network 150. Additionally, according to other exemplary scenarios, an RRC Reconfiguration message may be transmitted as a part of an RRC connection re-establishment procedure.

FIGS. 3A-3D are diagrams illustrating another exemplary process of an exemplary embodiment of the beam configuration management service. As illustrated, an environment 300, which is consistent with environment 100, access network 105 includes an eNB 205 and gNB 210. FIGS. 3A-3D relate to an exemplary NSA scenario. However, as described herein, the beam configuration management service may be used in a SA context.

Figure 3A:
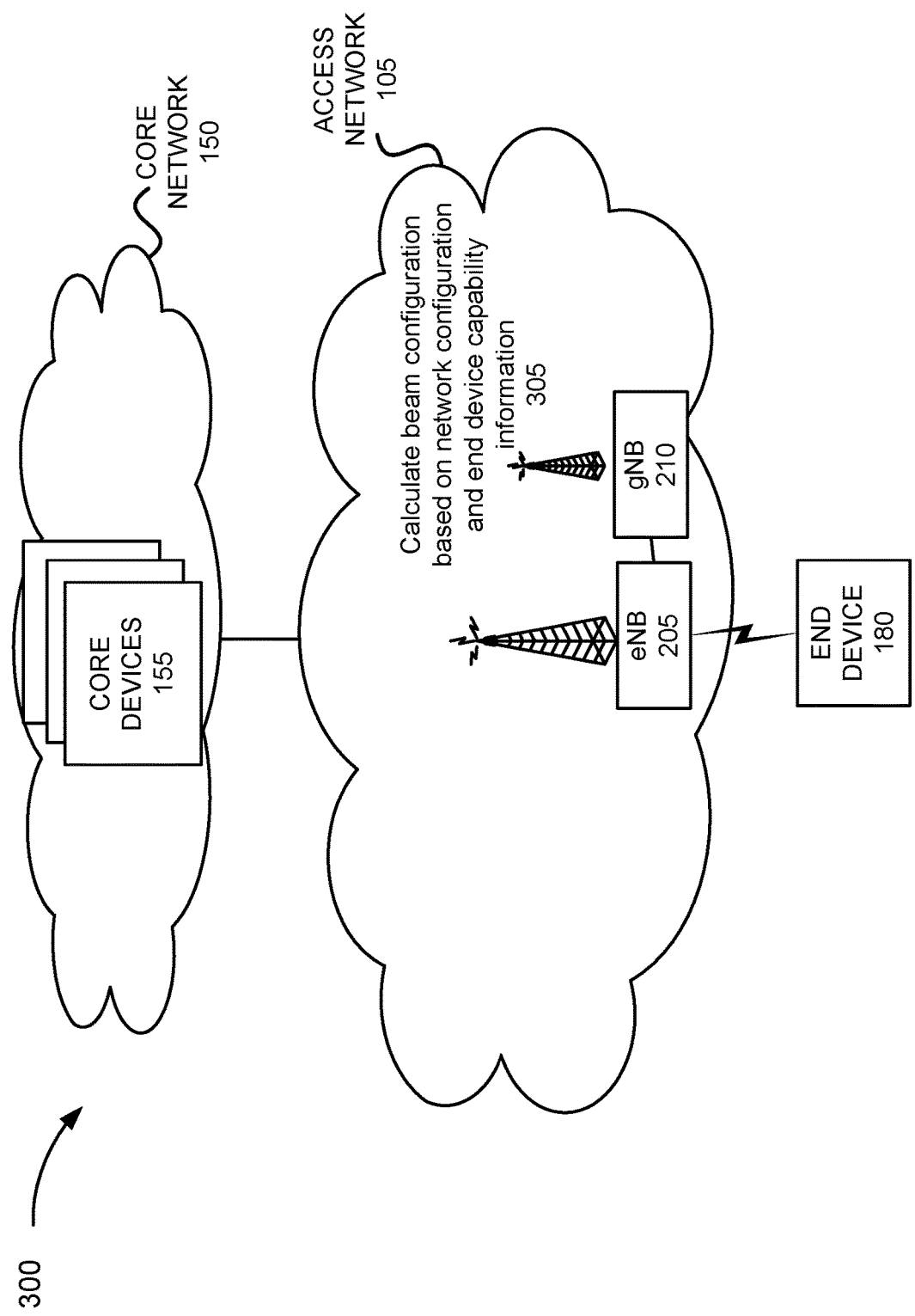

Referring to FIG. 3A, assume that steps previously described in relation to FIG. 2A have been performed, and in response to receiving an addition request, gNB 210 may calculate beam configuration for end device 180 based on network configuration and end device capability information 305.

As previously described, according an exemplary embodiment, the beam configuration management service includes a control plane message that has default beam configuration information. In this regard, gNB 210 may select a default beam configuration for carriers based on the network configuration and end device capability information. For example, a grouping of beam management parameters that have the same or similar configuration across carriers may be included in a default beam management IE. For any beam-management IE that has mostly different configurations across carriers, a separate per-carrier configuration may be added (e.g., in an IE). For example, gNB 210 may calculate or identify any difference values pertaining to parameters included in the default beam configuration, and determine any parameters to add, which may not be included in the default configuration, relative to any carrier.

As described below according to exemplary representation of data that may be included in a control plane message that includes default beam configurations (also referred to as message 4). For example, the Beam-Management IEs A and B may have the same or similar configurations across the carriers, so gNB 210 may include these in the defaultBeamManagementConfigAcrossCarriers. However, the Beam-Management IE C has mostly different configurations across the carriers, so such configurations may be indicated in SpCellConfig. In addition, there may be differences in Beam Management IE A for serving cell id X compared to the default configuration indicated in Beam-Management IE A of defaultBeamManagementConfigAcrossCarriers. In this regard, sCellConfig for serving cell id X may indicate delta configuration of Beam-Management IE A for serving cell id X Similarly, there may be differences in Beam-Management IE B for serving cell id Y compared to the default configuration indicated in Beam-Management IE B of defaultBeamManagementConfigAcrossCarriers. In this regard, sCellConfig for serving cell id Y may indicate delta configuration of Beam-Management IE B for serving cell id Y.

```
//Beam-Management IEs that have the same or similar configurations
across carriers are included in the
defaultBeamManagementConfigAcrossCarriers
    defaultBeamManagementConfigAcrossCarriers
    {
        Beam-Management IE-A
        Beam-Management IE-B
        ...
    }
    //For SpCell, the configuration from
defaultBeamManagmentConfigAcrossCarriers for Beam-Management IEs
A and B, and the configuration from SpCellConfig for Beam-
Management IE C may be used.
    SpCellConfig
    {
        Beam-Management IE C
        ...
    }
    //For serving cell ID X, the configuration from
defaultBeamManagementConfigAcrossCarriers for Beam-Management IE
B, and the configuration from sCellConfig for Beam-Management IE
C may be used.
    sCellConfig
    {
        servingCellid:      X
        Beam-Management IE A (only the delta configuration compared
with the default configuration is included)
        Beam-Management IE C
        ...
    }
    //For serving cell ID Y, the configuration from
defaultBeamManagementConfigAcrossCarriers for Beam-Management IE
A, and the configuration from sCellConfig for Beam-Management IE
C may be used.
For Beam-Management IE B, the configuration from
defaultBeamManagementConfigAcrossCarriers will be used but updated
by the delta configuration from sCellConfig.
    sCellConfig
    {
        servingCellid:      Y
        Beam-Management IE B (only the delta configuration compared
with the default configuration is included)
        Beam-Management IE C
        ...
    }
    ...
```

Referring to FIG. 3B, gNB 210 may generate and transmit a message, which includes the beam configuration information 310, to eNB 205. According to an exemplary implementation, the message may be included in an addition request acknowledgment message associated with the secondary node addition procedure. According to other exemplary implementations, the message may be that is not part of the secondary node addition procedure.

Figure 3C:
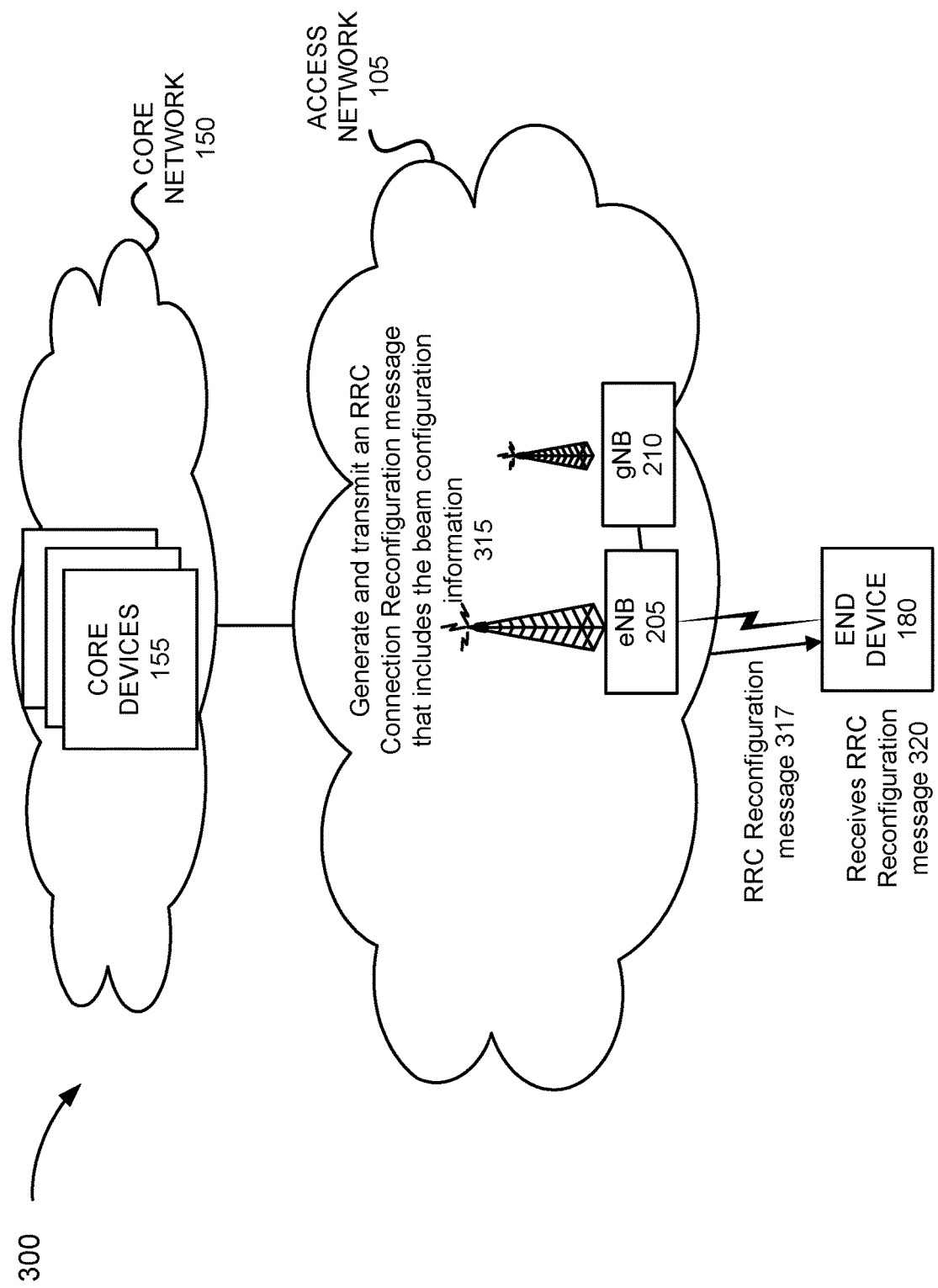

Referring to FIG. 3C, in response to receiving the message, eNB 205 may invoke an RRC Connection Reconfiguration procedure. For example, eNB 205 may generate and transmit an RRC Connection Reconfiguration message, which includes the beam configuration information 315, to end device 180. The RRC Reconfiguration message 317 may include one or multiple IEs that provide beam configuration for carriers, as described herein. End device 180 may receive the RRC Reconfiguration message 320.

Figure 3D:
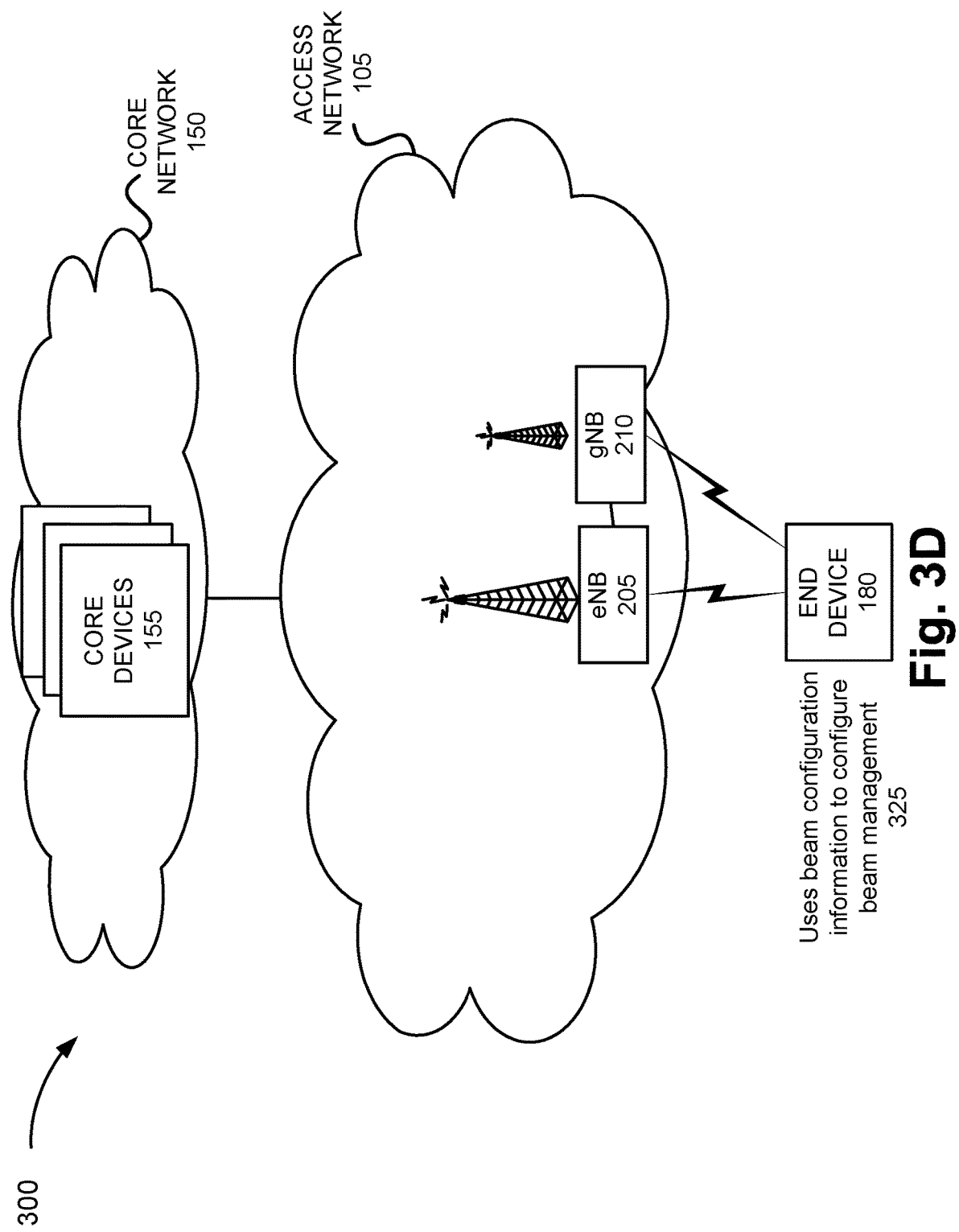

Referring to FIG. 3D, in response to receiving the RRC Reconfiguration message, end device 180 includes logic of the beam configuration management service to extract and use the beam configuration information to configure beam management functions 325. For example, end device 180 may analyze and use the beam management configuration for all carriers based on the default configuration information and the other beam configuration information (e.g., delta beam configuration information, etc.). Although not illustrated, end device 180 may generate and transmit a message pertaining to the RRC Connection Reconfiguration procedure, may perform a random access procedure relative to gNB 210, and may establish a radio connection with gNB 210.

Although FIGS. 3A-3D illustrate another exemplary process of the beam configuration management service, according to other exemplary embodiments, the process may include additional, different, and/or fewer steps, and/or include additional, different, and/or fewer messages. For example, according to an exemplary SA scenario, gNB 210 may generate and transmit an RRC Reconfiguration message, which includes beam configuration information, to end device 180 as a part of an attachment procedure with end device 180. For example, gNB 210 may transmit the RRC Reconfiguration message subsequent to end device 180 successfully completing authentication and security with core network 150.

FIG. 4 is a diagram illustrating exemplary components of a device 400 that may be included in one or more of the devices described herein. For example, device 400 may correspond to components included in access devices 110, core devices 155, end device 180, eNB 205, and gNB 210. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with respect access device 110 (e.g., eNB 205, gNB 210, etc.), software 420 may include an application that, when executed by processor 410, provides a function of the beam configuration management service, as described herein. Additionally, with reference to end device 180 or another network device, software 420 may include an application that, when executed by processor 410, provides a function of the beam configuration management service, as described herein. Software 420 may also include firmware, middleware, microcode, hardware description language (HDL), and/or other form of instruction. Software 420 may also be virtualized. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, spun up, spun down, etc., using well-known virtualization techniques in a public/private cloud or other type of network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
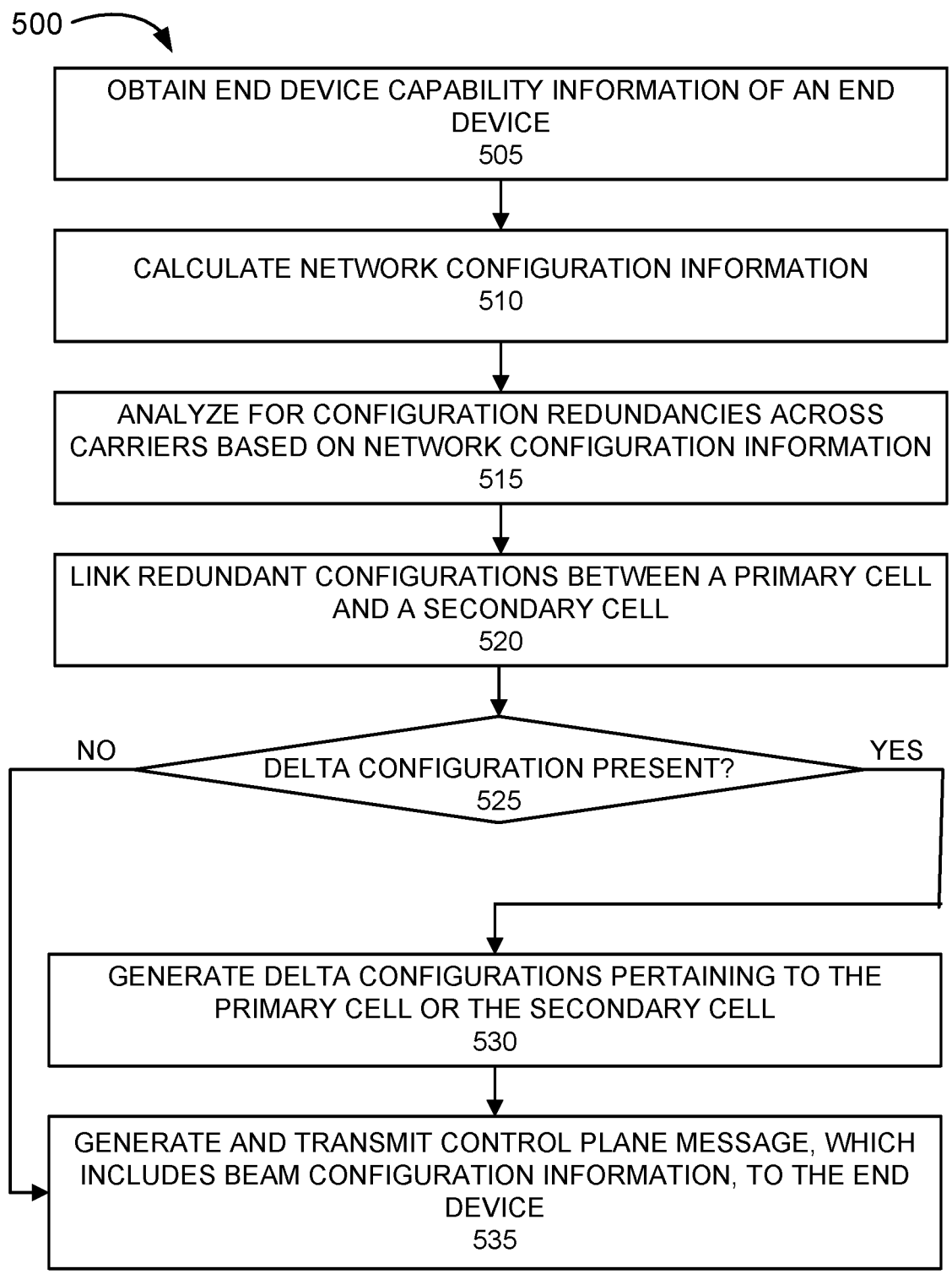
FIG. 5 is a flow diagram illustrating an exemplary process of an exemplary embodiment of the beam configuration management service.

FIG. 5 is a flow diagram illustrating an exemplary process 500 of an exemplary embodiment of the beam configuration management service. According to an exemplary embodiment, a network device of access network 105 performs steps of process 500. For example, the network device may be a gNB. Additionally, for example, processor 410 may execute software 420 to perform a step illustrated in FIG. 5 and described herein. Additionally, or alternatively, a step illustrated in FIG. 5 may be performed by execution of only hardware. Process 500 may be performed in relation to SA and NSA scenarios.

In block 505, end device capability information of an end device may be obtained. For example, gNB 210 may obtain end device capability information from core device 155 or end device 180. In block 510, network configuration information may be calculated. For example, gNB 210 may calculate network configuration information relating to beam configuration management based on an end device measurement report, pre-configured network parameters, channel state information, and the end device capability information. In block 515, configuration redundancies across carriers may be analyzed based on network configuration information. For example, gNB 210 may analyze configurations between cells/carriers (e.g., primary and secondary) and identify configurations that are the same. In block 520, redundant configurations that are identified may be linked. For example, gNB 210 may generate beam configuration information pertaining to the primary cell and linking data (e.g., a single bit pertaining to a secondary cell). In block 525, it may be determined whether there are delta configurations. For example, gNB 210 may determine whether there is secondary cell that has a beam configuration different from the primary cell.

When it is determined that there is no delta configuration (block 52—NO), process 500 may continue to block 535. When it is determined that there is delta configuration (block 525—YES), delta configuration pertaining to the primary cell or the secondary cell may be generated (block 530). For example, gNB 210 may generate delta configurations relative to the primary cell or the secondary cell as described in relation to message 2 or message 3. gNB 210 may select between message 2 or message 3 based on which cell (primary or secondary) the configuration is to be linked.

In block 535, a control plane message, which includes beam configuration information, may be generated and transmitted to the end device. For example, gNB 210 may generate the control plane message (e.g., RRC Connection Reconfiguration message) and transmit the message to end device 180.

Although FIG. 5 illustrates an exemplary process 500 of the beam configuration management service, according to other embodiments, process 500 may include additional operations, fewer operations, and/or different operations than those illustrated in FIG. 5, and described herein. For example, according to other exemplary embodiments, the beam configuration management service may select a control plane message (e.g., an IE) based on other factors, such as congestion level in the RAN. Additionally, or alternatively, gNB 210 may generate the beam configuration information and includes this information in an acknowledgement or other control plane message to another access device 110, and the other access device 110 may transmit the control plane message to end device 180. Additionally, for example, end device 180 may receive the control plane message and use the beam configuration information to establish a radio connection.

Figure 6:
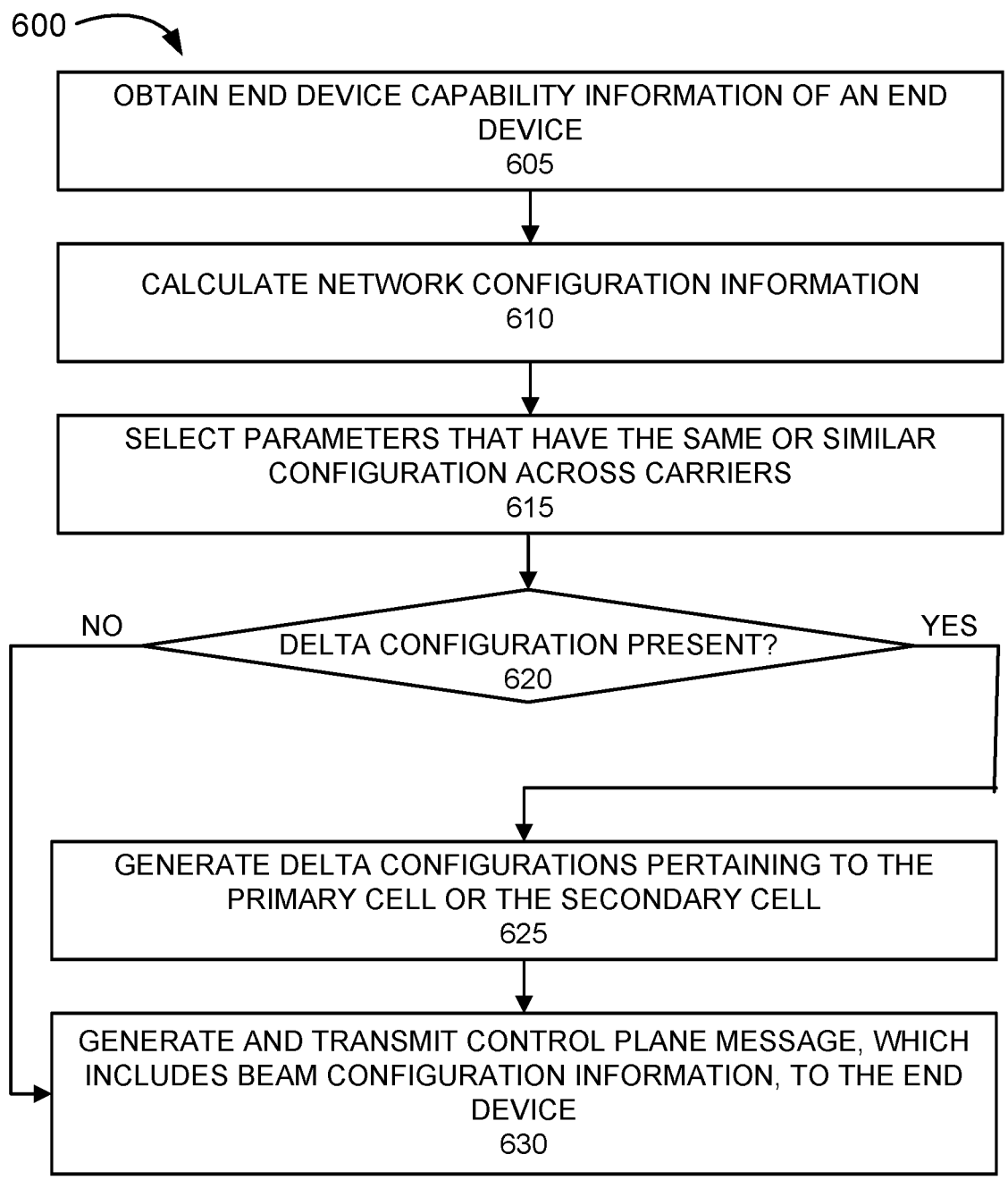
FIG. 6 is another flow diagram illustrating another exemplary process of an exemplary embodiment of the beam configuration management service.

FIG. 6 is a flow diagram illustrating another exemplary process 600 of an exemplary embodiment of the beam configuration management service. According to an exemplary embodiment, a network device of access network 105 performs steps of process 600. For example, the network device may be a gNB. Additionally, for example, processor 410 may execute software 420 to perform a step illustrated in FIG. 6 and described herein. Additionally, or alternatively, a step illustrated in FIG. 6 may be performed by execution of only hardware. Process 600 may be performed in relation to SA and NSA scenarios.

In block 605, end device capability information of an end device may be obtained. For example, gNB 210 may obtain end device capability information from core device 155 or end device 180. In block 610, network configuration information may be calculated. For example, gNB 210 may calculate network configuration information relating to beam configuration management based on an end device measurement report, pre-configured network parameters, channel state information, and the end device capability information.

In block 615, parameters that have the same or similar configuration across carriers may be selected. For example, gNB 210 may generate beam configuration information pertaining to primary and secondary cells that have the same or similar configurations. In block 620, it may be determined whether there are delta configurations. For example, gNB 210 may determine whether there are delta configurations between default beam configuration and the primary cell and/or the secondary cell, as described in relation to message 4.

When it is determined that there is no delta configuration (block 620—NO), process 600 may continue to block 630. When it is determined that there is delta configuration (block 620—YES), delta configuration pertaining to the primary cell or the secondary cell may be generated (block 625). For example, gNB 210 may generate delta configurations relative to the default beam configuration message as described in relation to message 4.

In block 630, a control plane message, which includes beam configuration information, may be generated and transmitted to the end device. For example, gNB 210 may generate the control plane message (e.g., RRC Connection Reconfiguration message) and transmit the message to end device 180.

Although FIG. 6 illustrates an exemplary process 600 of the beam configuration management service, according to other embodiments, process 600 may include additional operations, fewer operations, and/or different operations than those illustrated in FIG. 6, and described herein. For example, according to other exemplary embodiments, the beam configuration management service may select a control plane message (e.g., an IE) based on other factors, such as congestion level in the RAN. Additionally, or alternatively, gNB 210 may generate the beam configuration information and include this information in an acknowledgement or other control plane message to another access device 110, and the other access device 110 may transmit the control plane message to end device 180. Additionally, for example, end device 180 may receive the control plane message and use the beam configuration information to establish a radio connection.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. For example, although control plane messages that include beam configuration information have been described, other types of configuration parameters and IEs pertaining to other aspects of wireless service between the network and end devices may be used. In this way, control plane messaging overhead and resource utilization from both the network-side and the end device-side may be optimized. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described with regard to a process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415.

To the extent the aforementioned embodiments collect, store or employ personal information of individuals, it should be understood that such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage, and use of personal information can be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
    obtaining, by a network device, end device capability information pertaining to an end device;
    calculating, by the network device, network configuration information based on the end device capability information;
    analyzing, by the network device the network configuration information, for configuration redundancies across carriers that include at least one primary cell and at least one secondary cell, wherein the analyzing includes:
        determining, by the network device, that there is beam configuration information pertaining to one or more of the at least one secondary cell that is different from first beam configuration information pertaining to the at least one primary cell;
    generating, by the network device based on the analyzing, a control plane message that includes the first beam configuration information, second beam configuration information indicating to use the first beam configuration information by the least one secondary cell, and third beam configuration information indicating difference beam configuration information; and
    transmitting, by the network device, the control plane message to the end device.

2. The method of claim 1, wherein the control plane message includes a radio resource control (RRC) connection reconfiguration message.

3. The method of claim 1, wherein the third beam configuration information pertains to transmission configuration indicator (TCI) data or channel state information-reference signal (CSI-RS) resource data.

4. The method of claim 1, wherein the difference beam configuration information indicates to discard one or more beam configurations of the first beam configuration information, and to use one or more replacement beam configurations by one or more of the at least one secondary cell.

5. The method of claim 1, further comprising:
    generating, by the network device, fourth beam configuration information indicating beam configuration information that is common among secondary cells of the at least one secondary cell; and
    including, by the network device, the fourth beam configuration information in the control plane message.

6. The method of claim 5, wherein the fourth beam configuration information indicates a cell identifier of one of the secondary cells that is used to link a remaining of the secondary cells.

7. The method of claim 1, wherein the network device is a next generation Node B (gNB).

8. The method of claim 1, wherein the transmitting further comprises:
    transmitting, by the network device, the control plane message to the end device via a master wireless station of the network device.

9. A network device comprising:
    a communication interface;
    a memory, wherein the memory stores instructions; and
    a processor, wherein the processor executes the instructions to:
        obtain end device capability information pertaining to an end device;
        calculate network configuration information based on the end device capability information;
        analyze the network configuration information, for configuration redundancies across carriers that include at least one primary cell and at least one secondary cell, wherein the analysis includes to:
            determine that there is beam configuration information pertaining to one or more of the at least one secondary cell that is different from first beam configuration information pertaining to the at least one primary cell;

generate, based on the analysis, a control plane message that includes the first beam configuration information, second beam configuration information indicating to use the first beam configuration information by the least one secondary cell, and third beam configuration information indicating difference beam configuration information; and transmit, via the communication interface, the control plane message to the end device.

10. The network device of claim 9, wherein the control plane message includes a radio resource control (RRC) connection reconfiguration message.

11. The network device of claim 9, wherein the third beam configuration information pertains to transmission configuration indicator (TCI) data or channel state information-reference signal (CSI-RS) resource data.

12. The network device of claim 9, wherein the difference beam configuration information indicates to discard one or more beam configurations of the first beam configuration information, and to use one or more replacement beam configurations by one or more of the at least one secondary cell.

13. The network device of claim 9, wherein the processor further executes the instructions to:

generate fourth beam configuration information indicating beam configuration information that is common among secondary cells of the at least one secondary cell; and include the fourth beam configuration information in the control plane message.

14. The network device of claim 13, wherein the fourth beam configuration information indicates a cell identifier of one of the secondary cells that is used to link a remaining of the secondary cells.

15. The network device of claim 9, wherein the network device is a next generation Node B (gNB).

16. The network device of claim 9, wherein, when transmitting, the processor further executes the instructions to:

transmit, via the communication interface, the control plane message to the end device via a master wireless station of the network device.

17. A non-transitory computer-readable storage medium storing instructions executable by a processor of a device, which when executed cause the device to:

obtain end device capability information pertaining to an end device;

calculate network configuration information based on the end device capability information;

analyze the network configuration information, for configuration redundancies across carriers that include at least one primary cell and at least one secondary cell, wherein the analysis includes to:

determine that there is beam configuration information pertaining to one or more of the at least one secondary cell that is different from first beam configuration information pertaining to the at least one primary cell;

generate, based on the analysis, a control plane message that includes the first beam configuration information, second beam configuration information indicating to use the first beam configuration information by the least one secondary cell, and third beam configuration information indicating difference beam configuration information; and transmit the control plane message to the end device.

18. The non-transitory computer-readable storage medium of claim 17, wherein the control plane message includes a radio resource control (RRC) connection reconfiguration message.

19. The non-transitory computer-readable storage medium of claim 17, wherein the third beam configuration information pertains to transmission configuration indicator (TCI) data or channel state information-reference signal (CSI-RS) resource data.

20. The non-transitory computer-readable storage medium of claim 17, wherein the device is a next generation Node B (gNB).

* * * * *